United States Patent
Weder

Patent Number: 6,125,578
Date of Patent: Oct. 3, 2000

[54] FLORAL SLEEVE HAVING EXPANDABLE SIDEWALLS

[75] Inventor: Donald E. Weder, Highland, Ill.

[73] Assignee: Southpac Trust International, Inc.

[21] Appl. No.: 09/360,865

[22] Filed: Jul. 23, 1999

Related U.S. Application Data

[63] Continuation-in-part of application No. 08/146,162, Sep. 2, 1998, which is a continuation-in-part of application No. 09/064,460, Apr. 22, 1998, which is a continuation-in-part of application No. 08/788,616, Jan. 24, 1997, Pat. No. 5,749,171, which is a continuation-in-part of application No. 08/237,078, May 3, 1994, Pat. No. 5,625,979.

[51] Int. Cl.$^7$ ................................................ A01G 9/02
[52] U.S. Cl. .......................................................... 47/72
[58] Field of Search .................. 47/72, 82, DIG. 7, 47/41.12; 383/122; 206/554; 229/55, 57; 53/397, 465

[56] References Cited

U.S. PATENT DOCUMENTS

| | | | |
|---|---|---|---|
| Re. 21,065 | 5/1939 | Copeman | 93/2 |
| D. 259,333 | 5/1981 | Charbonneau | D9/306 |
| D. 279,279 | 6/1985 | Wagner | D11/143 |
| D. 301,991 | 7/1989 | Van Sant | D11/149 |
| D. 335,105 | 4/1993 | Ottenwalder et al. | D11/164 |
| D. 368,025 | 3/1996 | Sekerak et al. | D9/305 |
| 524,219 | 8/1894 | Schmidt . | |
| 732,889 | 7/1903 | Paver . | |
| 950,785 | 3/1910 | Pene . | |
| 1,063,154 | 5/1913 | Bergen . | |
| 1,446,563 | 2/1923 | Hughes . | |
| 1,520,647 | 12/1924 | Hennigan . | |
| 1,525,015 | 2/1925 | Weeks . | |
| 1,610,652 | 12/1926 | Bouchard . | |
| 1,697,751 | 1/1929 | Blake | 229/87 |
| 1,863,216 | 6/1932 | Wordingham . | |
| 1,978,631 | 10/1934 | Herrlinger | 91/68 |
| 2,048,123 | 7/1936 | Howard | 229/87 |
| 2,170,147 | 8/1939 | Lane | 206/56 |
| 2,200,111 | 5/1940 | Bensel | 229/1.5 |
| 2,278,673 | 4/1942 | Savada et al. | 154/43 |
| 2,302,259 | 11/1942 | Rothfuss | 41/10 |
| 2,323,287 | 7/1943 | Amberg | 229/53 |
| 2,355,559 | 8/1944 | Renner | 229/8 |
| 2,371,985 | 3/1945 | Freiberg | 206/46 |
| 2,411,328 | 11/1946 | MacNab | 33/12 |
| 2,510,120 | 6/1950 | Leander | 117/122 |
| 2,529,060 | 11/1950 | Trillich | 117/68.5 |
| 2,621,142 | 12/1952 | Wetherell | 154/117 |
| 2,648,487 | 8/1953 | Linda | 229/55 |
| 2,688,354 | 9/1954 | Berger | 150/28 |
| 2,774,187 | 12/1956 | Smithers | 47/41 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 2,989,828 | 6/1961 | Warp | 53/390 |

(List continued on next page.)

FOREIGN PATENT DOCUMENTS

| | | | |
|---|---|---|---|
| 42319/78 | 12/1977 | Australia | 47/72 |
| 4231978 | 6/1979 | Australia . | |
| 654427 | 1/1965 | Belgium . | |

(List continued on next page.)

OTHER PUBLICATIONS

Speed Cover Brochure, "The Simple Solution For Those Peak Volume Periods", Highland Supply Corporation, ©1989.

"Speed Sheets and Speed Rolls", Highland Supply Corporation, ©1990.

(List continued on next page.)

*Primary Examiner*—Peter M. Poon
*Assistant Examiner*—Francis T Palo
*Attorney, Agent, or Firm*—Dunlap, Codding & Rogers PC.

[57] ABSTRACT

A floral sleeve sized to fit a flower pot, the sleeve having a base portion with side and bottom gussets for allowing expansion from a flattened position and method of using same. The sleeve may comprise a detachable upper portion, and a skirt portion.

27 Claims, 5 Drawing Sheets

U.S. PATENT DOCUMENTS

| | | | |
|---|---|---|---|
| 3,022,605 | 2/1962 | Reynolds | 47/58 |
| 3,080,680 | 3/1963 | Reynolds | 47/37 |
| 3,094,810 | 6/1963 | Kalpin | 47/37 |
| 3,121,647 | 2/1964 | Harris et al. | 118/202 |
| 3,130,113 | 4/1964 | Silman | 161/97 |
| 3,271,922 | 9/1966 | Wallerstein et al. | 53/3 |
| 3,322,325 | 5/1967 | Bush | 229/62 |
| 3,376,666 | 4/1968 | Leonard | 47/41 |
| 3,380,646 | 4/1968 | Doyen et al. | 229/57 |
| 3,431,706 | 3/1969 | Stuck | 53/390 |
| 3,508,372 | 4/1970 | Wallerstein et al. | 53/3 |
| 3,510,054 | 5/1970 | Sanni et al. | 229/66 |
| 3,512,700 | 5/1970 | Evans et al. | 229/53 |
| 3,552,059 | 1/1971 | Moore | 47/41.12 |
| 3,554,434 | 1/1971 | Anderson | 229/55 |
| 3,556,389 | 1/1971 | Gregoire | 229/53 |
| 3,557,516 | 1/1971 | Brandt | 53/14 |
| 3,620,366 | 11/1971 | Parkinson | 206/59 |
| 3,670,954 | 6/1972 | Leventhal | 229/57 |
| 3,681,105 | 8/1972 | Milutin | 117/15 |
| 3,767,104 | 10/1973 | Bachman et al. | 229/7 |
| 3,793,799 | 2/1974 | Howe | 53/32 |
| 3,869,828 | 3/1975 | Matsumoto | 47/34.11 |
| 3,888,443 | 6/1975 | Flanigen | 248/152 |
| 3,962,503 | 6/1976 | Crawford | 428/40 |
| 4,043,077 | 8/1977 | Stonehocker | 47/66 |
| 4,054,697 | 10/1977 | Reed et al. | 428/40 |
| 4,091,925 | 5/1978 | Griffo et al. | 206/423 |
| 4,113,100 | 9/1978 | Soja et al. | 206/602 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,248,347 | 2/1981 | Trimbee | 206/423 |
| 4,265,049 | 5/1981 | Gorewitz | 47/26 |
| 4,280,314 | 7/1981 | Stuck | 53/241 |
| 4,297,811 | 11/1981 | Weder | 47/72 |
| 4,333,267 | 6/1982 | Witte | 47/84 |
| 4,347,686 | 9/1982 | Wood | 47/73 |
| 4,353,497 | 10/1982 | Bustin | 229/55 |
| 4,380,564 | 4/1983 | Cancio et al. | 428/167 |
| 4,400,910 | 8/1983 | Koudstall et al. | 47/84 |
| 4,413,725 | 11/1983 | Bruno et al. | 206/45.33 |
| 4,546,875 | 10/1985 | Zweber | 206/0.82 |
| 4,621,733 | 11/1986 | Harris | 206/423 |
| 4,640,079 | 2/1987 | Stuck | 53/390 |
| 4,717,262 | 1/1988 | Roen et al. | 383/120 |
| 4,733,521 | 3/1988 | Weder et al. | 53/580 |
| 4,765,464 | 8/1988 | Ristvedt | 206/0.82 |
| 4,771,573 | 9/1988 | Stengel | 47/67 |
| 4,773,182 | 9/1988 | Weder et al. | 47/72 |
| 4,801,014 | 1/1989 | Meadows | 206/423 |
| 4,810,109 | 3/1989 | Castel | 383/105 |
| 4,835,834 | 6/1989 | Weder | 29/525 |
| 4,941,572 | 7/1990 | Harris | 206/423 |
| 4,980,209 | 12/1990 | Hill | 428/34.1 |
| 5,073,161 | 12/1991 | Weder et al. | 493/154 |
| 5,074,675 | 12/1991 | Osgood | 383/122 |
| 5,104,235 | 4/1992 | Bronstrup et al. | 383/10 |
| 5,105,599 | 4/1992 | Weder | 53/399 |
| 5,111,637 | 5/1992 | Weder et al. | 53/397 |
| 5,111,638 | 5/1992 | Weder | 53/397 |
| 5,120,382 | 6/1992 | Weder | 156/212 |
| 5,147,706 | 9/1992 | Kingman | 428/195 |
| 5,152,100 | 10/1992 | Weder et al. | 47/72 |
| 5,181,364 | 1/1993 | Weder | 53/397 |
| 5,199,242 | 4/1993 | Weder et al. | 53/397 |
| 5,205,108 | 4/1993 | Weder et al. | 53/397 |
| 5,228,234 | 7/1993 | de Klerk et al. | 47/41.01 |
| 5,235,782 | 8/1993 | Landau | 47/72 |
| 5,239,775 | 8/1993 | Landau | 47/72 |
| 5,249,407 | 10/1993 | Stuck | 53/399 |
| 5,259,106 | 11/1993 | Weder et al. | 29/469.5 |
| 5,307,605 | 5/1994 | Straeter | 53/397 |
| 5,307,606 | 5/1994 | Weder | 53/410 |
| 5,315,785 | 5/1994 | Avôt et al. | 47/72 |
| 5,350,240 | 9/1994 | Billman et al. | 383/104 |
| 5,353,575 | 10/1994 | Stepanek | 53/461 |
| 5,361,482 | 11/1994 | Weder et al. | 29/469 |
| 5,388,695 | 2/1995 | Gilbert | 206/423 |
| 5,428,939 | 7/1995 | Weder et al. | 53/397 |
| 5,443,670 | 8/1995 | Landau | 156/191 |
| 5,493,809 | 2/1996 | Weder et al. | 47/72 |
| 5,496,251 | 3/1996 | Cheng | 493/224 |
| 5,496,252 | 3/1996 | Gilbert | 493/224 |
| 5,517,802 | 5/1996 | Weder | 53/397 |
| 5,526,932 | 6/1996 | Weder | 206/423 |
| 5,572,826 | 11/1996 | Weder | 47/41.12 |
| 5,572,849 | 11/1996 | Weder et al. | 53/399 |
| 5,572,851 | 11/1996 | Weder | 53/399 |
| 5,575,133 | 11/1996 | Weder et al. | 53/397 |
| 5,617,703 | 4/1997 | Weder | 53/413 |
| 5,624,320 | 4/1997 | Martinez | 472/51 |
| 5,625,979 | 5/1997 | Weder | 47/72 |
| 5,647,168 | 7/1997 | Gilbert | 47/72 |
| 5,749,171 | 5/1998 | Weder | 47/72 |
| 5,755,514 | 5/1998 | Baar-Bartelt | 383/104 |
| 5,941,393 | 8/1999 | Wilfong | 206/554 |

FOREIGN PATENT DOCUMENTS

| | | |
|---|---|---|
| 0050990 | 5/1982 | European Pat. Off. . |
| 0791543 | 8/1997 | European Pat. Off. . |
| 1376047 | 9/1964 | France . |
| 2036163 | 12/1970 | France . |
| 2137325 | 12/1972 | France . |
| 2272914 | 12/1975 | France . |
| 2489126 | 3/1982 | France . |
| 2610604 | 8/1988 | France . |
| 2603159 | 3/1989 | France . |
| 2619698 | 3/1989 | France . |
| 345464 | 12/1921 | Germany . |
| 513971 | 11/1930 | Germany . |
| 1166692 | 3/1964 | Germany . |
| 1962947 | 6/1971 | Germany . |
| 2060812 | 11/1971 | Germany . |
| 2748626 | 5/1979 | Germany . |
| 3445799 | 6/1986 | Germany . |
| 3829281 | 5/1989 | Germany . |
| 3911847 | 10/1990 | Germany . |
| 224507 | 4/1996 | Italy . |
| 542958 | 2/1993 | Japan . |
| 8301709 | 12/1984 | Netherlands . |
| 1000658 | 1/1996 | Netherlands . |
| 560532 | 4/1975 | Switzerland . |
| 5605 | 5/1885 | United Kingdom . |
| 1204647 | 9/1970 | United Kingdom . |
| 2056410 | 3/1981 | United Kingdom . |
| 2074542 | 11/1981 | United Kingdom . |
| 2128083 | 4/1984 | United Kingdom . |
| 2252708 | 8/1992 | United Kingdom . |
| 9315979 | 8/1993 | WIPO . |

OTHER PUBLICATIONS

"Color Them Happy with Highlander Products" ©1992.

"Costa Keeps the Christmas Spirit", Supermarket Floral, Sep. 15, 1992.

"Super Seller", Supermarket Floral, Sep. 15, 1992.

"Halloween", Link Magazine, Sep. 1992, 2 pages.

"Now More Than Ever", Supermarket Floral, Sep. 15, 1992.

Le Plant Sac Advertisement, published prior to Sep. 26, 1987.

"A World of Cut Flower and Pot Plant Packaging" Brochure, Klerk's Plastic Products Manufacturing, Inc., published prior to Mar. 31, 1994, 6 pages.

Chantler & Chantler brochure showing Zipper Sleeve™ and Florasheet®, published prior to Mar. 31, 1994, 2 pages.

"Foil Jackets" brochure, Custom Medallion, Inc., Dec., 1996, 2 pages.

"Derwent Abstract" of FR 2610604A. It is noted that the abstract is an incorrect English translation of the contents of the French patent. The French patent does not enable or disclose adhesively attaching the covering to the container, 1988.

FLORAL SLEEVE HAVING EXPANDABLE SIDEWALLS

CROSS REFERENCE TO RELATED APPLICATIONS

The present application is a continuation-in-part of U.S. Ser. No. 09/146,162, filed Sep. 2, 1998 pending, which is a continuation in part of Ser. No. 09/064,460, filed Apr. 22, 1998 pending, which is a continuation-in-part of U.S. Ser. No. 08/788,616 filed Jan. 24, 1997, now U.S. Pat. No. 5,749,171, issued on May 12, 1998, which is a continuation-in-part of U.S. Ser. No. 08/237,078, filed May 3, 1994, now U.S. Pat. No. 5,625,979, issued on May 6, 1997. Each of these applications is hereby incorporated by reference herein in its entirety.

FIELD OF THE INVENTION

This invention generally relates to sleeves, and, more particularly, sleeves used to contain floral groupings and media, or used to wrap flower pots containing floral groupings and/or media containing floral groupings, and methods of using same.

BRIEF DESCRIPTION OF THE DRAWINGS

FIG. 9 is a perspective view of a sleeve having a gusset in each side but having a bottom gusset having a different configuration than the bottom gusset in FIGS. 1–8.

FIG. 10 is a perspective view of a sleeve similar to the sleeve of FIG. 10 but having a concave lower end.

DESCRIPTION OF THE PREFERRED EMBODIMENTS

The present invention contemplates a preformed sleeve for covering a flower pot having an upper end, a lower end, and an outer peripheral surface or for being used itself as a container for a plant. The preformed sleeve comprises a base portion having an upper end, a lower end, and an interior space sized to contain a pot or a medium for containing a plant. A skirt portion may optionally extend from the upper end of the base portion. The sleeve comprises expansion elements which comprise one or more gussets in each side of the base portion and optionally in the skirt portion where present and optionally in a detachable upper portion where present. The preformed sleeve is initially formed in a flattened condition and may be shipped in a flat condition or may be expanded to an open condition prior to shipment. The base portion of the sleeve further comprises a gusset in the bottom thereof. Each side and the bottom may comprise more than one gusset therein. A bonding material may be disposed on an inner surface of the base portion for connecting the sleeve to the pot. The gusset expansion element functions to aid the base portion in expanding to contain a pot and in conforming to the shape of a pot when a pot is disposed within the sleeve. The preformed sleeve may further comprise a detachable upper portion generally sized to enclose a floral grouping and which when detached may allow the skirt portion, if present, to extend away from the base portion when a pot is disposed within the base portion of the sleeve. The upper portion when present may be detachable via perforations, tear strips, weakened areas, or zippers. The upper portion may have an area which serves as a handle or support device. The gusset expansion elements may extend the entire length from the lower end of the base portion to the upper end of the sleeve or may extend only an intermediate distance therebetween.

The gusset expansion elements are not intended to be limited only to those shown herein in view of the fact that gussets and their manufacture are well known to those of ordinary skill in the art of manufacturing bags.

The preformed sleeve may form part of a plant package when used in conjunction with a pot assembly disposed within the retaining space of the base portion of the sleeve, the pot assembly having a floral grouping disposed therein, and wherein the pot assembly is substantially surrounded and encompassed by the base portion and the floral grouping is substantially surrounded and enclosed by the upper portion in those embodiments wherein it forms a part of the preformed sleeve.

Further, the detachable upper portion when present extends from the upper end of the skirt portion when present, or it may be connected to the base portion. When the upper portion is connected to the base portion, it may be connected to an inner portion of the base portion, leaving the skirt portion exposed, or it may be attached to an outer portion of the base portion, thereby enclosing the skirt portion until the upper portion is detached from the base portion thereby exposing the skirt portion.

The preformed sleeve may be constructed from one or more types of material. The preformed sleeve may comprise a portion of a plant package which additionally comprises a pot assembly disposed within the sleeve, the pot assembly having a floral grouping disposed therein, and wherein the pot assembly is substantially surrounded and encompassed by the base portion. Alternatively, the plant package may comprise only the sleeve, a plant, and a medium for containing the plant.

These embodiments and others of the present invention are now described in more detail below. It will be appreciated that the examples provided herein are not intended to limit the scope and extent of the claimed invention but are only intended to exemplify various of the embodiments of the invention contemplated herein.

The Embodiments and Methods of Use of FIGS. 1–11

Shown in FIG. 1 and designated therein by the general reference numeral 10 is a flexible preformed tubular sleeve (herein after also referred to as sleeve 10). The sleeve 10 is initially formed as a flexible flat collapsed piece of material which is openable in the form of a tube or sleeve which has a closed bottom, or a closed bottom having draining holes or a partially open bottom (not shown). Prior to shipment to the user, or prior to use by the user, the sleeve 10 may be expanded into an opened configuration. The sleeve 10 is preferably tapered outwardly from the lower end toward a larger diameter at its upper end. In its flattened state the sleeve 10 preferably has an overall trapezoidal or modified trapezoidal shape, and when opened is substantially frusto-conical. It will be appreciated, however, that the sleeve 10 may comprise variations on the aforementioned shapes or may comprise significantly altered shapes such as square or rectangular, as long as the sleeve 10 functions in accordance with the present invention in the manner described herein.

Figure 2:
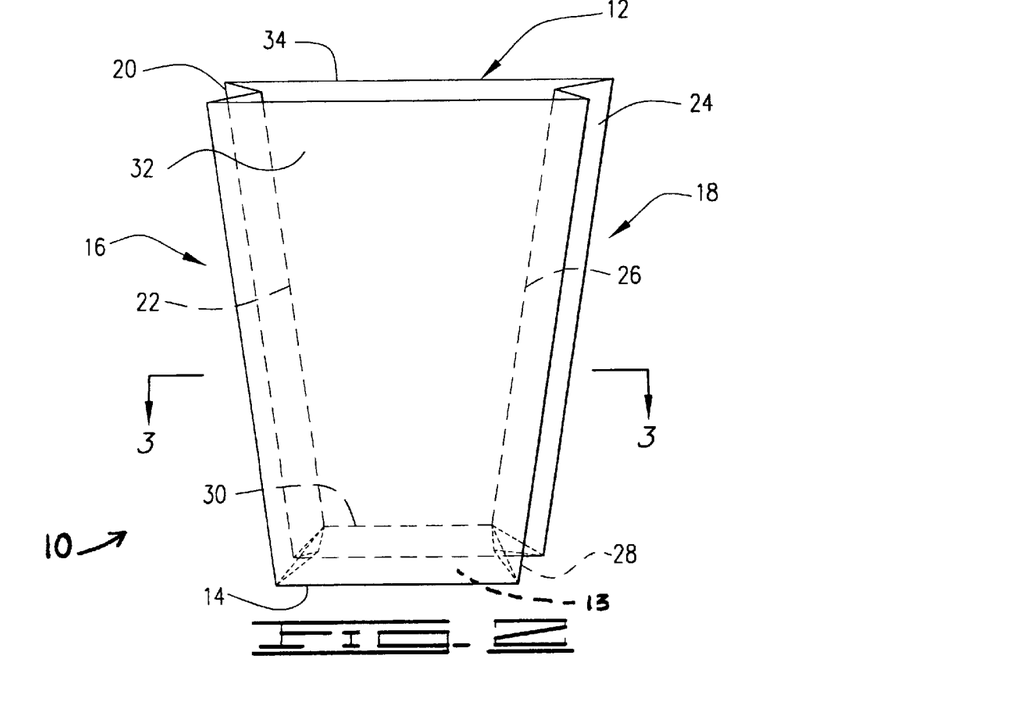
FIG. 2 is a perspective view of the sleeve of FIG. 1 partially expanded.
Figure 3:
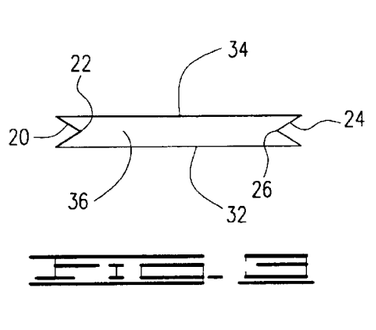
FIG. 3 is a cross-sectional view of the sleeve of FIG. 2 taken alone lines 3—3.
Figure 4:
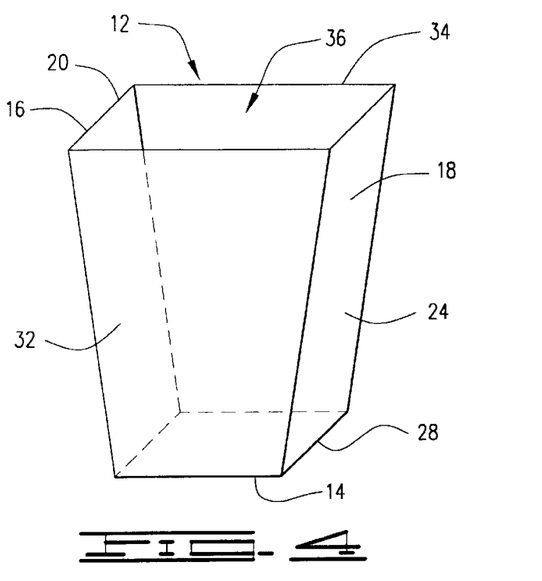
FIG. 4 is a perspective view of the sleeve of FIG. 2 fully expanded.

The sleeve 10 has an upper end 12, a lower end 14, a first side 16 and a second side 18. The sleeve 10 has an opening at the upper end 12 and is closed with a bottom 13 at the lower end 14. The sleeve 10 also has an inner peripheral surface 15 which, when the sleeve 10 is opened, defines and encompasses an inner retaining space 36 as indicated in FIGS. 3 and 4. The first side 16 comprises a first side gusset 20 having an inner fold 22. The second side 18 comprises a second side gusset 24 having an inner fold 26. A portion of the lower end 14 is preferably folded to form one or more bottom gussets 28 constructed in a manner well known to one of ordinary skill in the art as shown in FIG. 1 for permitting a bottom of an object such as a potted plant to be disposed into the inner retaining space 36 of the sleeve 10. Each bottom gusset 28 has an inner fold 30 as shown in the embodiment of FIG. 2. Further the lower end 14 and particularly the bottom gusset 28 therein may be constructed to form a round bottom sleeve in the manner shown in copending U.S. Ser. No. 08/606,957, the specification of which is hereby incorporated herein in its entirety. The sleeve 10 in an alternate embodiment may be constructed without a bottom gusset 28 in its lower end 14. In another embodiment, the bottom gusset 28 may be constructed in a different configuration from that shown herein. The sleeve 10 further comprises a first panel 32 between first side 16 and second side 18, and a second panel 34 disposed between first side 16 and second side 18, and facing first panel 32.

Further, the sleeve 10 may comprise any shape, whether geometric, non-geometric, asymmetrical and/or fanciful as long as it functions in accordance with the present invention. The sleeve 10 may also be equipped with a drainage hole (e.g., one or more holes) in the base portion or bottom 13 thereof or ventilation holes (not shown) in the base or upper portion, or can be made from permeable or impermeable materials.

FIG. 3 shows a cross-section taken of sleeve 10 of FIG. 2 along lines 3—3, the sleeve 10 is slightly open, showing the inner retaining space 36, as well as the first side gusset 20 with inner fold 22, the second side gusset 24 with inner fold 26, and the first panel 32 and the second panel 34. When the sleeve 10 is in the fully open configuration as shown in FIG. 4, the first side gusset 20 and the second side gusset 24 are expanded to form the first side 16 and the second side 18 of the sleeve 10, respectively. Similarly bottom gusset 28 is open to form the bottom 13 of the sleeve 10. Preferably the sleeve 10 is sized to contain and conform to one of a variety of standard sizes of pots known to those of ordinary skill in the art, such as 4 inch, 6 inch and 8 inch pots. As noted above the sleeve 10 itself may be used to contain a plant and a growing medium without the use of a pot.

Figures 5, 6:
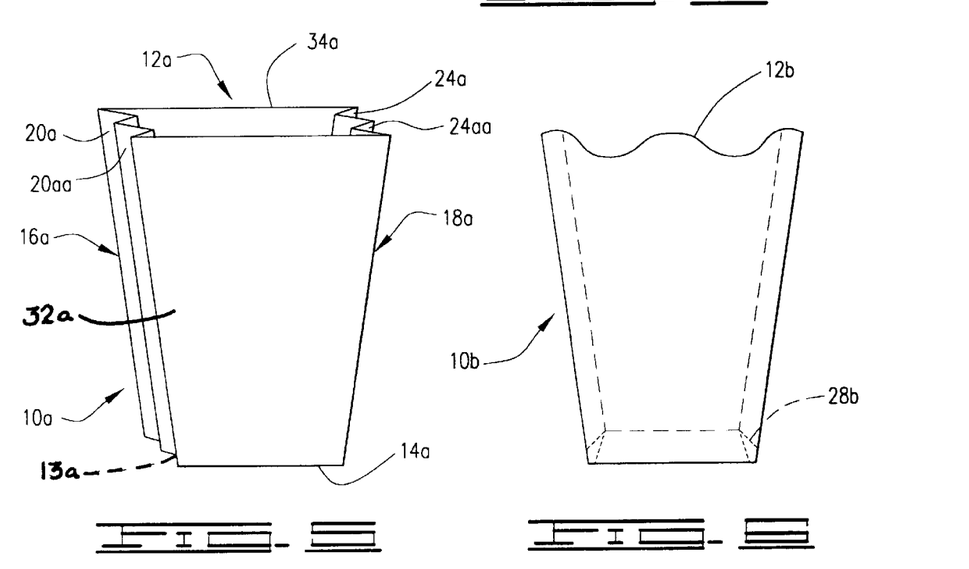
FIG. 5 is a perspective view of a sleeve similar to the sleeve of FIG. 1 but having two gussets in each side of the sleeve.
FIG. 6 is an elevational view of another sleeve constructed in accordance with the present invention and having a non-linear upper end.

The sleeve contemplated herein may have more than one side and/or bottom gusset, for example as shown in FIG. 5. Sleeve 10a is a sleeve having an upper end 12a, a bottom 13a a lower end 14a, a first side 16a and a second side 18a. The sleeve 10a has two first side gussets 20a and 20aa in the first side 16a, and two second side gussets 24a and 24aa in the second side 18a. The sleeve 10a further has a first panel 32a and a second panel 34a. The present invention further contemplates sleeve embodiments comprising a plurality of gussets in each side of the sleeve and/or in the bottom of the sleeve.

The upper end of the sleeves contemplated herein may have a variety of patterns. FIG. 6 shows a sleeve 10b having a curved, or non-linear, upper end 12b comprising a skirt portion 17b. The non-linear upper end 12b of the skirt portion 17b may be wavy, sinusoidal, scalloped, crenulate, crenelate, zig-zagged, or toothed, in any regular or irregular pattern.

Figure 7:
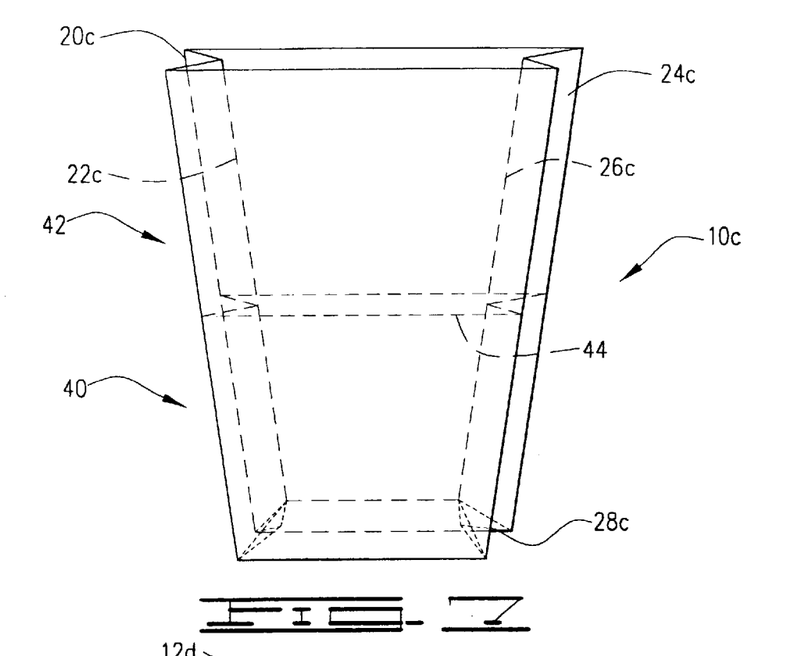
FIG. 7 is a perspective view of a partially expanded sleeve having an upper portion detachable via a line of perforations.

The invention further contemplates a sleeve having a detachable upper portion such as sleeve 10c shown in FIG. 7. Sleeve 10c is constructed in a manner similar to any of sleeves 10–10b except sleeve 10c comprises a lower portion 40 and an upper portion 42. The upper portion 42 is detachable from the lower portion 40 via a detaching element 44 such as perforations. The sleeve 10c has a first side gusset 20c having inner fold 22c and a second side gusset 24c having inner fold 26c, in a manner similar to that for the previously-described sleeve. The term "detaching element," or as used generally herein, means any element, or combination of elements, or features, such as, but not by way of limitation, perforations, tear strips, weakened areas, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching elements" known in the art, or any combination thereof, could be substituted therefore and/or used therewith. Preferably, the upper portion 42 is sized to substantially enclose a floral grouping, and the lower portion 40 is sized to contain and enclose a flower pot.

Figure 8:
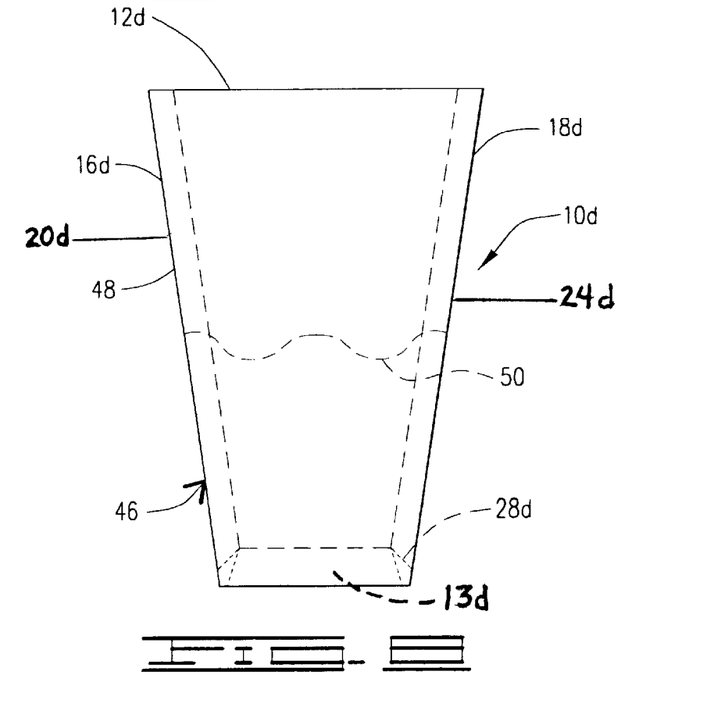
FIG. 8 is an elevational view of a sleeve similar to the sleeve of FIG. 7 but having a non-linear line of perforations.

FIG. 8 shows a sleeve 10d similar to sleeve 10c except sleeve 10d comprises a lower portion 46 and an upper portion 48 which is detachable from the lower portion 46 via a detaching element 50 such as perforations having a non-linear pattern. The non-linear pattern may have the same pattern as described above for the upper end 12b of sleeve 10b. Sleeve 10d further comprises a first side 16d with a first side russet 20d and a second side 18d with a second side gusset 24d, and a bottom 13d with a bottom gusset 28d.

As noted elsewhere herein, the configuration of the gusset shown in the sleeves of FIGS. 1–8 are not the only configurations contemplated for the present invention. Any gusset which functions in accordance with the present invention may be used. For example FIG. 9 shows a sleeve 10e having a first side 16e having a first side gusset 20e with an inner fold 22e, and a second side 18e having a second side gusset 24e with an inner fold 26e and a lower end 14e having a bottom gusset 28e with an inner fold 30e defining a bottom 13e, which comprise configurations which are different from corresponding features of the sleeves of FIGS. 1–8. Sleeve 10e, however, functions in essentially the same manner, and is otherwise constructed in the same manner, as the sleeves of FIGS. 1–8.

FIG. 10 shows a sleeve 10f which is constructed in a manner similar to that of sleeve 10e in FIG. 9 except for the configuration of a lower end of the sleeve 10f. Sleeve 10f has an upper end 12f, a lower end 14f, a first side 16f with a first side gusset 20f having an inner fold 22f, and a second side 18f with a second side gusset 24f having an inner fold 26f, the lower end 14f has a bottom gusset 28f having an inner fold 30f which defines the bottom 13f of the sleeve 10f. The bottom gusset 28f has curved portions 52 and 54 which provide the sleeve 10f with the appearance of having a curved lower end 14f when in the flattened condition. The bottom gusset 28f also has curved portions 56 and 58 in the first side 16f and curved portions 60 and 62 in the second side 18f. The curved portions 52–62 of the bottom gusset 28f provide the sleeve 10f with the bottom 13f which has a rounded configuration in the open condition (i.e., a rounded bottom) for more closely conforming to the rounded configuration of a typical round-bottom flower pot.

Figure 11:
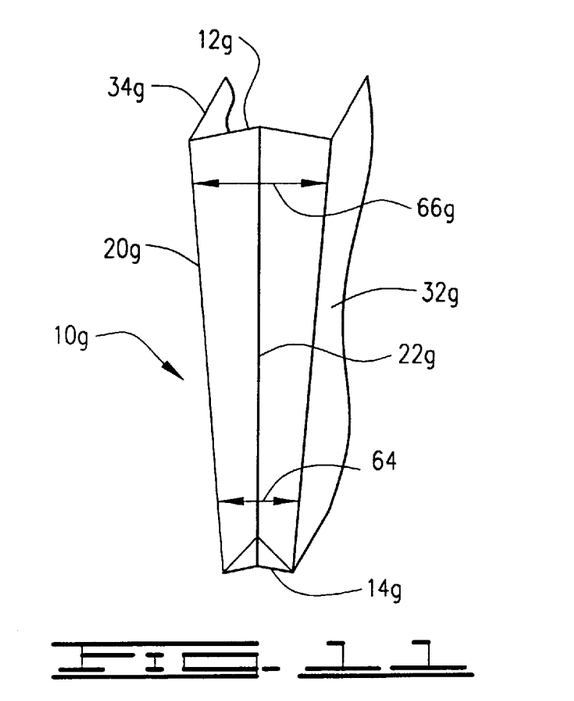
FIG. 11 is a partial cutaway view of a sleeve having a tapered side gusset.

Any sleeve described herein may be constructed in a manner shown in sleeve 10g in FIG. 11 wherein a side gusset 20g having an inner fold 22g is tapered to have a lesser width 64 at its lower end 14g and a greater width 66 at its upper end 12g. Such a configuration enables the sleeve 10g to have a tapered shape not only in the dimension spanning the first panel 32g and the second panel 34g, respectively, but also in the dimension spanning the sides of the sleeve 10g.

Figure 12:
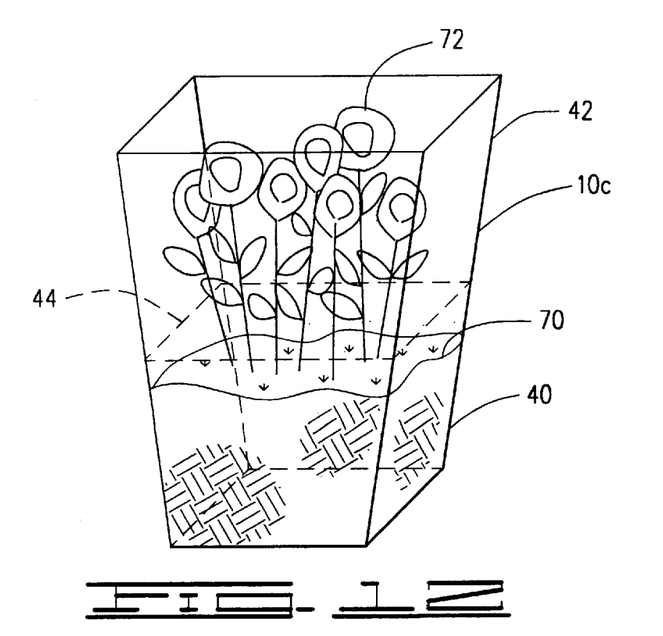
FIG. 12 is a perspective view of the sleeve of FIG. 7 opened and containing a plant and growing medium.
Figure 13E:
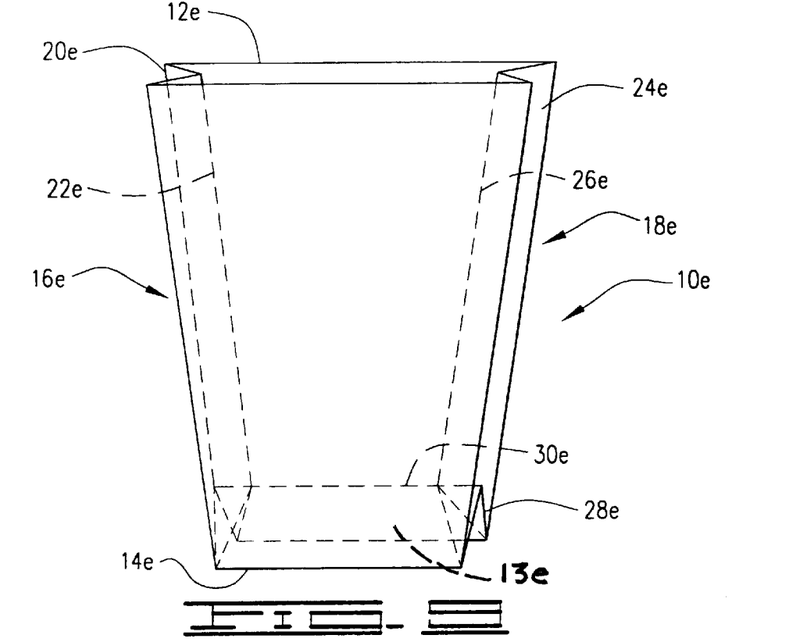
Figure 13F:
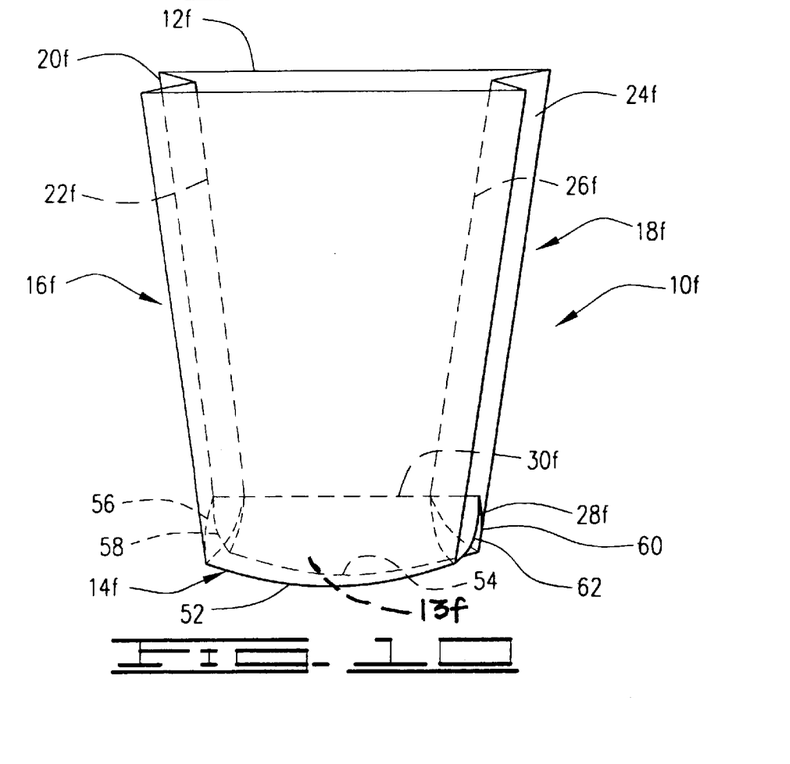

FIG. 12 shows sleeve 10c of FIG. 7, having a lower portion 40 and a upper portion 42 which is separable via detaching element 44 being used as a container for a plant medium 70 and a plant 72, disposed within the plant medium 70 without using a pot. In a preferred version, the lower portion 40 is constructed of a material resistant or impermeable to leakage, while the upper portion 42 is primarily constructed of a thinner transparent or translucent material.

The material from which the sleeve is constructed preferably has a thickness in a range from about 0.1 mil to about 30 mils. Often, the thickness of the sleeve is in a range from about 0.5 mil to about 10 mils. Preferably, the sleeve has a thickness in a range from about 1.0 mil to about 5 mils. More preferably, the sleeve is constructed from a material which is flexible, semi-rigid, rigid, or any combination thereof. The sleeve may be constructed of a single layer of material or a plurality of layers of the same or different types of materials. Any thickness of the material may be utilized as long as the material functions in accordance with the present invention and is expandable to an open position as described herein. The layers of material comprising the sleeve may be connected together or laminated or may be separate layers. Such materials used to construct the sleeve 10 are described in U.S. Pat. No. 5,111,637 entitled "Method For Wrapping A Floral Grouping" issued to Weder et al., on May 12, 1992, which is hereby incorporated herein by reference. Any thickness of material may be utilized in accordance with the present invention as long as the sleeve may be formed as described herein, and as long as the formed sleeve may contain at least a portion of a pot or potted plant or a floral grouping, as described herein. Additionally, an insulating material such as bubble film, preferable as one of two or more layers, can be utilized in order to provide additional protection for the item, such as the floral grouping, contained therein.

In one embodiment, the sleeve may be constructed from a sheet comprising two polypropylene films. The material comprising the sleeve may be connected together or laminated or may be separate layers. In an alternative embodiment, the sleeve may be constructed from only one of the polypropylene films.

The sleeve is constructed from any suitable material that is capable of being formed into a sleeve and wrapped about a pot and a floral grouping disposed therein. Preferably, the material comprises paper (untreated or treated in any manner), metal foil, polymer film, non-polymer film, fabric (woven or nonwoven or synthetic or natural), cardboard, fiber, cloth, burlap, or laminations or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The material comprising the sleeve may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. The material may further comprise, or have applied thereto, one or more scents. Each of the above-named characteristics may occur alone or in combination and may be applied to the upper and/or lower surface of the material comprising the sleeve. Moreover, portions of the material used in constructing the sleeve may vary in the combination of such characteristics. The material utilized for the sleeve itself may be opaque, translucent, transparent, or partially clear or tinted transparent.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In accordance with the present invention, a bonding material may be disposed on a portion of the sleeve to assist in holding the sleeve to the pot having the floral grouping therein when such a pot is disposed within the sleeve or to assist in closing or sealing the upper portion of the sleeve or in adhering the sleeve to the pot after the pot has been disposed therein for example in the manner shown in U.S. Pat. No. 5,493,809 which is hereby incorporated by reference herein in its entirety.

It will be understood that the bonding material may be disposed as a strip or block on a surface of the sleeve. The bonding material may also be disposed upon either an outer peripheral surface or an inner peripheral surface of the sleeve, as well as upon the pot. Further, the bonding material may be disposed as spots of bonding material, or in any other geometric, non-geometric, asymmetric, or fanciful form, and in any pattern including covering either the entire inner peripheral surface and/or outer peripheral surface of the sleeve and/or the pot or pot cover. The bonding material may be covered by a cover or release strip which can be removed prior to the use of the sleeve, pot or pot cover. The bonding material can be applied by means known to those of ordinary skill in their art. One method for disposing a bonding material, in this case an adhesive, is described in U.S. Pat. No. 5,111,637 entitled "Method For Wrapping A Floral Grouping" issued to Weder et al., on May 12, 1992, which has been incorporated by reference above.

The term "bonding material when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material also includes materials which are sonic sealable and vibratory sealable. The term "bonding material when used herein also means a heat sealing lacquer or hot melt material which may be applied to the material and, in this instance, heat, sound waves, or vibrations, also must be applied to effect the sealing.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

It will be understood by a person of ordinary skill in the art that equipment and devices for forming floral sleeves are commercially available, and are well known to a person of ordinary skill in the art. Therefore, further discussion of the construction of the sleeves described herein is not deemed necessary.

In one version of the present invention a strip of bonding material (not shown) may be disposed adjacent the upper end of the sleeve for allowing the upper end to be sealed for enclosing the upper portion of the sleeve about a floral grouping disposed therein. In another version of the present invention, a sleeve may comprise a flap positioned at the upper end which can be folded over and sealed with a flap bonding strip to an adjacent portion of the outer peripheral surface of the sleeve near the upper end thereof. Other versions of the sleeve (not shown) may comprise ventilation holes or drainage holes (e.g., holes in the lower end 14) for allowing movement of gases or moisture to and away from the inner space of the sleeve.

In another embodiment, the sleeve, may further comprise an extended portion having apertures therein, which portion extends away from a portion of the upper end of the sleeve for allowing the sleeve to be supported on a support assembly commercially available and known by one of ordinary skill in the art such as a pair of wickets for shipment, storage, assembly of the sleeve, placement of the pot within the sleeve, or other functions known in the art. The extension may have a plurality of perforations or other detaching elements for allowing the extension to be removed from the upper end of the sleeve after the sleeve has been provided for use as described elsewhere herein. In another version of the invention, a sleeve has an extended portion comprising a handle for carrying the potted plant package by the sleeve. The sleeve may further comprise a detaching element comprising perforations for removing the handle at a later time.

Other versions of the present invention may comprise additional perforated areas for enhancing angularity of the extension of a skirt portion away from a base portion after an upper portion of the sleeve has been detached. Examples of such sleeves described above herein comprising these additional features are shown in FIGS. 6–8 and 14–20 of U.S. Pat. No. 5,625,979 and the corresponding descriptions therein, which are specifically hereby incorporated herein by reference.

Each side gusset of the sleeve comprises one or more areas of excess material which may have the form of a pleat which extends from the lower end to the upper end of the sleeve. Preferably the surfaces of the facing surfaces of the gussets are substantially unconnected to each other along their lengths.

Figure 1:
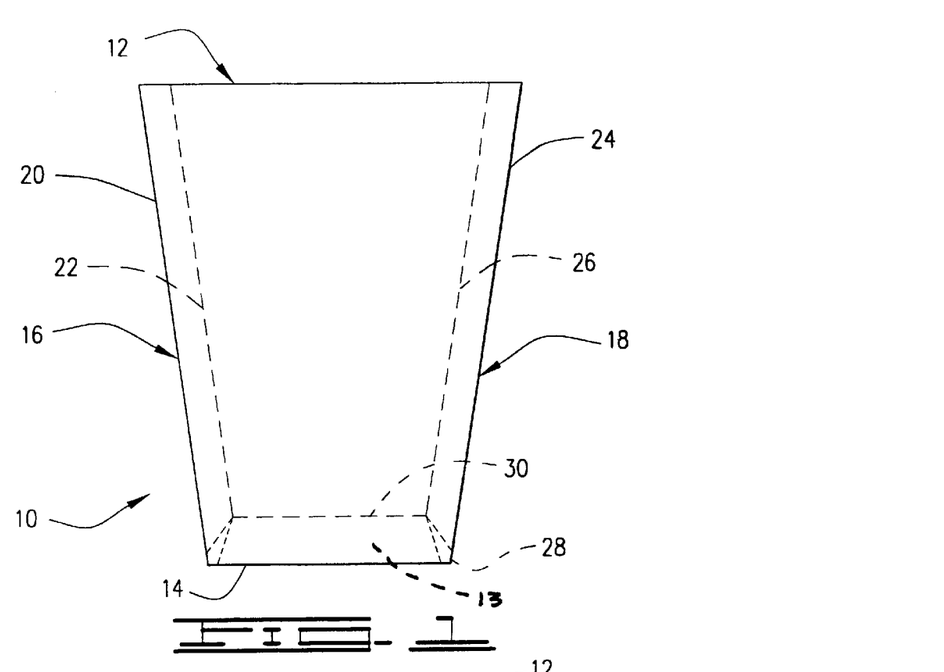
FIG. 1 is an elevational view of a sleeve having gusset expansion elements in each side thereof.

The side gussets in the sleeve contemplated herein may be constructed in such a way that each side gusset extends completely from the lower end of the sleeve to the upper end of the sleeve, for example as shown in FIG. 1. Alternatively, a sleeve may comprise gussets which extend from the upper end only part of the distance toward the lower end or from the lower end to only the part of the distance toward the upper end.

It will generally be desired to use the sleeve 10 as a covering for a potted plant.

The term "pot" as used herein refers to any type of container used for holding a floral grouping or plant. Examples of pots, used in accordance with the present invention include, but not by way of limitation, clay pots, wooden pots, plastic pots, pots made from natural mad/or synthetic fibers, or any combination thereof. The pot is adapted to receive a floral grouping in the retaining space. The floral grouping may be disposed within the pot along with a suitable growing medium described in further detail below, or other retaining medium, such as a floral foam. It will also be understood that the floral grouping, and any appropriate growing medium or other retaining medium, may be disposed in the sleeve without a pot (see FIG. 12).

The sleeves described herein may be formed by advancing two separate webs, one or two webs preformed in the form of a tube, or a single web folded double and sealing the longitudinal sides and bottom of the two facing panels then cutting the sleeve thus formed from the webs or web. Machines which can form sleeves from such single webs or pairs of webs are well within the knowledge of one of ordinary skill in the art.

It should also be noted that for all versions of sleeves described, it may be desirable to have a release material or cover strip covering the adhesive or cohesive bonding material when such a bonding material is disposed on any portion of the sleeve for preventing the bonding material from bonding to another surface until the desired time. Further in each of the cases described herein wherein a sleeve is applied to a pot or a covered pot, the sleeve may be applied thereto either by depositing the pot or covered pot downwardly into the open retaining space of the sleeve, or the sleeve may be brought upwardly about the pot or covered pot from below the pot or a covered pot.

It should be further noted that various features of the versions of the present invention such as closure bonding areas, support extensions, handles, additional perforations, drainage holes, ventilation holes, combinations of material may be used alone or in combination as elements of any of the embodiments described above herein.

Changes may be made in the construction and the operation of the various components, elements and assemblies described herein or in the steps or the sequence of steps of the methods described herein without departing from the spirit and scope of the invention as defined in the following claims.

What is claimed is:

1. A preformed sleeve sized to contain a flower pot, comprising:
    a sleeve initially having a flattened condition prior to being opened for use, and having an upper end, a lower end, a first side, a second side, a first panel and a second panel, the sleeve tapered from the upper end to the lower end, and having an expansion element comprising a gusset in each of the first side, the second side, and the lower end, wherein the gussets expand when the sleeve is opened from the flattened condition to enable deposition of a flower pot into the opened sleeve.

2. The sleeve of claim 1 wherein each gusset has an inner fold.

3. The sleeve of claim 1 further comprising a skirt portion which extends above the upper end of the flower pot when a flower pot is disposed within the sleeve.

4. The sleeve of claim 3 wherein the skirt portion has an upper end having a non-linear pattern.

5. The sleeve of claim 1 further comprising a detachable upper portion which is sized to substantially enclose a floral grouping disposed within a flower pot disposed within the sleeve.

6. The sleeve of claim 5 wherein the upper portion has a first gusset in a first side thereof and a second gusset in a second side thereof.

7. The sleeve of claim 5 wherein the upper portion is detachable via a detaching element selected from the group consisting of perforations, tear strips and zippers.

8. The sleeve of claim 5 wherein the upper portion is detachable via perforations having a non-linear pattern.

9. The sleeve of claim 1 wherein the lower end is curved.

10. The sleeve of claim 1 wherein the sleeve comprises an adhesive or cohesive bonding material disposed upon a portion thereof.

11. The sleeve of claim 1 wherein the sleeve substantially conforms to an overall shape of a flower pot when said pot is disposed within the sleeve.

12. The sleeve of claim 5 wherein the upper portion has an upper end which has an adhesive or cohesive bonding material thereon for sealing the upper end of the upper portion.

13. The sleeve of claim 1 further defined as constructed from a material selected from the group consisting of treated or untreated paper, metal foil, polymer film, non-polymer film, cardboard, fiber, cloth, burlap, and laminations or combinations thereof.

14. The sleeve of claim 1 further defined as constructed from a material having a thickness in a range of from about 0.1 mils to about 30 mils.

15. The sleeve of claim 1 further defined as constructed from a material having a thickness in a range of from about 0.5 mils to about 10 mils.

16. The sleeve of claim 1 further defined as constructed from a material having a thickness in a range of from about 1 mil to about 5 mils.

17. A preformed sleeve sized to contain a flower pot, comprising:
    a sleeve initially having a flattened condition prior to being opened for use, and having an upper end, a lower end, a first side, a second side, a first panel and a second panel, the sleeve having an expansion element comprising a gusset in each of the first side, the second side, and the lower end, wherein said gussets expand when the sleeve is opened from the flattened condition to enable deposition of a flower pot therein, the sleeve further comprising a detachable upper portion, the detachable upper portion sized to substantially enclose a floral grouping or plant disposed within the flower pot and extending a distance above the flower pot.

18. The sleeve of claim 17 wherein the sleeve is tapered from the upper end to the lower end.

19. The sleeve of claim 17 wherein the upper portion is detachable via perforations.

20. The sleeve of claim 17 further comprising a skirt portion wherein the upper portion is detachable from the skirt portion.

21. The sleeve of claim 20 wherein the skirt portion has an upper end having a non-linear pattern.

22. The sleeve of claim 17 wherein each gusset has an inner fold.

23. The sleeve of claim 17 wherein the lower end is curved.

24. The sleeve of claim 17 wherein the upper portion has a first gusset in a first side thereof and a second gusset in a second side thereof.

25. The sleeve of claim 17 wherein the sleeve substantially conforms to an overall shape of a pot when said pot is disposed within the sleeve.

26. The sleeve of claim 19 wherein the upper portion is detachable via perforations having a non-linear pattern.

27. The sleeve of claim 17 wherein the upper portion has an upper end which has an adhesive or cohesive bonding material thereon for sealing the upper end of the upper portion.

* * * * *

UNITED STATES PATENT AND TRADEMARK OFFICE
CERTIFICATE OF CORRECTION

PATENT NO.    : 6,125,578
DATED         : October 3, 2000
INVENTOR(S)   : Donald E. Weder It is certified that error appears in the above-identified patent and that said Letters Patent is hereby corrected as shown below:

Title page,
Item [63], Related U.S. Application Data, change number "08/146,162" to number -- 09/146,162 --.

Column 4,
Line 48, change word "russet" to word -- gusset --.

Column 5,
Line 24, after word "and" and before word "upper" change word "a" to word -- an --.

Column 8,
Line 48, after word "only" and before word "part" delete word "the".
Line 56, after word "natural" change phrase "mad/or" to phrase -- and/or --.

Column 9,
Line 17, after word "or" and before word "covered" delete word "a".

Signed and Sealed this

Eighteenth Day of October, 2005

JON W. DUDAS
*Director of the United States Patent and Trademark Office*